United States Patent
Yuvaraj et al.

(10) Patent No.: US 11,409,590 B2
(45) Date of Patent: Aug. 9, 2022

(54) PROACTIVE OUTREACH PLATFORM FOR ERROR RESOLUTION BASED ON USER INTENT IN SERVER-DRIVEN COMMUNICATION CHANNELS

(71) Applicant: PAYPAL, INC., San Jose, CA (US)

(72) Inventors: Nishanthi Yuvaraj, Austin, TX (US); Sangeetha Devaraj, Austin, TX (US); Rajani Budda, Austin, TX (US); Roberto Gonzalez Ibarra, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 21 days.

(21) Appl. No.: 16/837,917

(22) Filed: Apr. 1, 2020

(65) Prior Publication Data
US 2021/0311815 A1 Oct. 7, 2021

(51) Int. Cl.
G06F 11/00 (2006.01)
G06F 11/07 (2006.01)
H04L 41/22 (2022.01)

(52) U.S. Cl.
CPC ...... *G06F 11/0769* (2013.01); *G06F 11/0709* (2013.01); *G06F 11/0751* (2013.01); *H04L 41/22* (2013.01)

(58) Field of Classification Search
CPC ............. G06F 11/0709; G06F 11/0751; G06F 11/0769; G06F 11/0781; G06F 11/3089; G06F 11/3438; G06F 11/3466
See application file for complete search history.

(56) References Cited

U.S. PATENT DOCUMENTS 7,870,491 B1 * 1/2011 Henderson .............. G06F 9/453
715/745
8,200,527 B1 6/2012 Thompson et al.
(Continued)

OTHER PUBLICATIONS

Avaya., "Using Avaya Proactive Outreach Manager," Retrieved from the Internet URL: https://downloads.avaya.com/css/P8/documents/101058477, Retrieved on Jul. 6, 2021, Release 3.1.2, Issue 1.1, Jul. 2019, 49 pages.
(Continued)

*Primary Examiner* — Elmira Mehrmanesh
(74) *Attorney, Agent, or Firm* — Haynes and Boone, LLP (57) ABSTRACT

There are provided systems and methods for a proactive outreach platform for server-driven communication channel presentation. A service provider, such as an electronic transaction processor for digital transactions, may utilize a data aggregation operation to detect different error or help events occurring thought different domains, pages, and interfaces of service provider. Using these events, mappings of user intents that resulted in the error event, and assistance channels may be generated. Rule may be established for mapping user intents to channels based on the error events, as well as issue priority and user engagement. Thereafter, when a user accesses a particular online service of the service provider and is performing an operation that results in an error, such as an account access failure, the mappings and rules may be used to proactively outreach to the user with a particular assistance channel that may result the user's error event.

18 Claims, 5 Drawing Sheets

(56) References Cited

U.S. PATENT DOCUMENTS

| | | | |
|---|---|---|---|
| 10,162,734 B1* | 12/2018 | Podgorny | H04L 67/02 |
| 10,346,282 B2* | 7/2019 | Kaulgud | G06F 11/3664 |
| 10,382,370 B1* | 8/2019 | Labarre | H04L 51/02 |
| 10,459,951 B2* | 10/2019 | Venkataraman | G06F 16/285 |
| 10,832,254 B2* | 11/2020 | Cohen | G06F 16/951 |
| 10,838,801 B2* | 11/2020 | Rau | G06F 11/0787 |
| 10,917,520 B1* | 2/2021 | T. G | H04M 3/5233 |
| 10,979,305 B1* | 4/2021 | Finci | H04M 15/61 |
| 11,097,187 B1* | 8/2021 | Tomlinson | A63F 13/70 |
| 2005/0198556 A1 | 9/2005 | Tripp et al. | |
| 2008/0162688 A1* | 7/2008 | Reumann | G06Q 10/10 |
| | | | 709/224 |
| 2012/0079087 A1* | 3/2012 | Mukherjee | H04L 67/02 |
| | | | 709/223 |
| 2013/0080362 A1 | 3/2013 | Chang et al. | |
| 2014/0222503 A1 | 8/2014 | Vijayaraghavan et al. | |
| 2015/0033077 A1* | 1/2015 | Bhamidipaty | G06F 3/04847 |
| | | | 714/37 |
| 2016/0048446 A1* | 2/2016 | Kumar | G06F 11/3466 |
| | | | 717/128 |
| 2016/0239848 A1* | 8/2016 | Chang | G06Q 30/016 |
| 2016/0246885 A1* | 8/2016 | Aravamudhan | G06F 16/9535 |
| 2017/0140285 A1* | 5/2017 | Dotan-Cohen | H04W 4/02 |
| 2018/0005246 A1* | 1/2018 | Basam | H04L 41/0631 |
| 2018/0150571 A1* | 5/2018 | Douglas | G06Q 10/06 |
| 2019/0179890 A1 | 6/2019 | Evermann | |
| 2019/0347326 A1* | 11/2019 | Kozhaya | G06F 40/35 |
| 2020/0019420 A1* | 1/2020 | Saimani | G06N 5/04 |
| 2020/0074476 A1* | 3/2020 | Ellison | G06N 3/088 |
| 2020/0201744 A1* | 6/2020 | Ho | G06F 11/0769 |
| 2020/0394097 A1* | 12/2020 | Shete | H04L 9/0618 |
| 2021/0109843 A1* | 4/2021 | Datta | G06F 11/3636 |

OTHER PUBLICATIONS

International Application No. PCT/US2021/025346, International Search Report and Written Opinion dated Aug. 10, 2021, 10 pages.

* cited by examiner

PROACTIVE OUTREACH PLATFORM FOR ERROR RESOLUTION BASED ON USER INTENT IN SERVER-DRIVEN COMMUNICATION CHANNELS

TECHNICAL FIELD

The present application generally relates to assistance outreach for resolving errors in operation across a service provider's online computing services and more particularly to a proactive outreach platform that utilizes aggregated data to perform user interface transformations through specific help channels during a processing error.

BACKGROUND

Users may utilize computing devices to access online domains and platforms to perform various computing operations and view available data. Generally, these operations are provided by different service providers, and users may navigate through webpages and/or interfaces to access data and request processing operations, such as account establishment and access, messaging and communications, electronic transaction processing, social networking, and other types of available online activities the service provider may offer. However, during use of these computing services, a user may encounter an error event, which may prevent further navigations or processing, or otherwise adversely affect the user's ability to utilize the services. This may be caused by issues with navigational instructions, authentication credentials, incorrect data entry, and the like. In order to resolve theses, users previously were required to do self-research or self-educate, view help documents or presentations, or manually contact the service provider, which often results in long queues and wait times. Thus, users were not provided targeted assistance or assisted in a manner most efficient for the particular computing issue. Thus, operational issues were not resolved or took significant amount of time and effort to fix.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a proactive outreach platform for server-driven communication channel presentation. Systems suitable for practicing methods of the present disclosure are also provided.

A service provider may provide different computing resources and services to users through different interfaces of websites and/or webpages, domains, and/or resident applications (e.g., which may reside locally on a computing device and connect to a service provider server to present data and perform computing operations on the device). When utilizing the services of a particular service provider, a user may navigate between interfaces, pages, and other data and request processing operations, such as by entering data and/or requesting the service provider execute some processing using an interaction between the user's client device and the service provider's computing resources. However, when performing navigations and/or operations, if some user input and/or device action is incorrect, unrecognized, or otherwise unknown to the service provider's systems, this may cause an error event with the computing service being provided to the user's device. The user may therefore be unable to complete the requested action and may be required to request assistance or help in resolving the issue.

To address this problem, utilizing a proactive outreach platform as discussed herein, a user may be provided with intelligent assistance in a fast and coordinated manner by automatically routing the user to a particular assistance channel on detection of the error event that provides data and operations to assist the user. The proactive outreach platform may be generated and constructed by intelligently learning user intents in utilizing the computing services of the service provider (e.g., the user's intent is requesting or performing some operation that results in the error) and mapping those to particular assistance channels, where the channels may provide different data and operations depending on the user intent. Thus, rules may be generated by a machine learning engine and/or set by an administrator to select particular channels depending on the user intent, an urgency or escalation factor to resolving the user's intent, and/or another parameter of the outreach system and error events. Thereafter, the proactive outreach platform may inject or otherwise provide a script to the various interfaces, pages, or other accessible domains data that allows for the proactive outreach platform to listen for error events. When detected, the script links the error event to the proactive outreach platform, which then accesses the constructed mappings. The proactive outreach platform may then use the mappings to determine a particular assistance channel that provides help and assistance based on the error event's cause, user intent, and other parameters. The proactive outreach platform may then provide an automatic user interface (UI) transformation that presents the assistance channel to the user through the user's device. Thereafter, the proactive outreach platform may monitor the user's use of the assistance channel and/or resolution of the error event to determine any changes or updates to the mappings, rules or other assistance data.

Thus, a service provider may provide computing resources, services, and data through UIs deployable and presentable through one or more applications, including web browsers, dedicated applications resident of a client device, and the like. These applications may include different user interfaces, which may be used to provide data and executable processes to users. In this regard, a service provider, which may provide services to users, including electronic transaction processing, such as online transaction processors (e.g., PayPal®) that allows merchants, users, and other entities to processes transactions, provide payments, and/or transfer funds between these users. When interacting with the service provider, the user may therefore process a particular transaction and transactional data to provide a payment to another user or a third-party for items or services. Moreover, the user may view other digital accounts and/or digital wallet information, including a transaction history and other payment information associated with the user's payment instruments and/or digital wallet. The user may also interact with the service provider to establish an account and other information for the user through the third-party's application. In further embodiments, other service providers may also provide computing services, including social networking, microblogging, media sharing, messaging, business and consumer platforms, etc. These computing services may be deployed across multiple different applications including different applications for different operating systems and/or device types.

In various embodiments, in order to utilize the computing services of a service provider, an account with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The user may also be required to provide financial information, including payment card (e.g., credit/debit card) information, bank account information, gift card information, benefits/incentives, and/or financial investments, which may be used to process transactions after identity confirmation, as well as purchase or subscribe to services of the service provider. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. These accounts may be accessed to determine the user and/or entity data and may also be used by the users to process transactions.

Thus, the online service provider may provide account services to users of the online service provider. A user wishing to establish the account may first access the online service provider and request establishment of an account. In order to pay for the transaction (e.g., a transfer or payment to another user, merchant, or other entity), the user may also be required to provide user financial or funding source information or may login to an account with the service provider through authentication information and process the transaction using the account. For an application to utilize and provide these services of the service provider, for example, to establish and maintain the account, as well as provide electronic transaction processing through a third-parties application, the service provider may access one or more UIs associated with the service provider via an application of a client device, and perform actions, navigate between UIs and/or data, and/or request data processing or other operations. However, as discussed herein, errors and other issues may occur that prevents successful completion of the computing operations between the user's client device and the service provider's system.

When generating a proactive outreach platform to provide automated and real-time assistance in resolving these issues in a coordinated manner, the service provider's platform may initially aggregate and collect past errors by previous users of the service provider's systems and domains. For example, across different domains, services, and/or other computing operations provided by the service provider, users may previously encounter errors and issues that lead to the error events and required resolution to complete certain processes that the user was engaged in prior to the error. The proactive outreach platform may also collect data for the error events that led to the error events, such as the operations that the user was engaged in prior to the error event, as well as any user and/or device information. For example, the platform may determine what the navigations, input, and/or requested processing operation were, information about the user and/or account (e.g., location, language, account status, payment instruments available, etc.), and any device data or parameters (e.g., device type, identifier, IP or network address, network connection type or status, etc.). The platform may also determine data from different services offered by the user based on tracking the user's use of the service provider's services. Thus, one or more domains, such as a customer journey domain, customer care application programming interfaces (APIs), different platforms or service channels, and/or different processing flows through services including checkout, transfer, and/or payment processing flows may be utilized to track error events and corresponding data. Additionally, issue or error priority, as well as customer or user engagement (e.g., the particular operations the user is requesting that cause the error and the user's engagement and priority level with the service provider), may also be collected for the past error events.

Once the previous error events and corresponding data have been collected and aggregated, the proactive outreach platform of the service provider may then utilize a rules engine to perform mappings of error events to user intents and assistance or help channels. In this regard, a user intent may correspond to data indicating some processing operation requested to be performed by the user with the service provider, such as some data processing operation occurring between the user's device and the service provider, and which caused the error event. In some embodiments, the user intent may correspond to a request to access an account, enter or change authentication credentials, perform electronic transaction processing, upload or download data, navigate to a certain page, data, or interface, enter or process user input, perform a deposit or withdrawal of funds to an account or between accounts, add or remove a financial instrument, message or communicate with another entity, post data including images and text, or otherwise utilize a data processing and computing resource and/or service. Other intents may include adding or removing a bank of financial instrument from an account and/or digital wallet, removing a risk limitation placed on an account or transaction, performing a transaction dispute, and/or tracking a refund.

Further, the user intent may include the reason or event that lead to the error, such as what the particular operational data was being requested to be performed. In this regard, the user intent may include data of the user's device actions, activities, and data processing requests at the time of the error event (e.g., a particular navigation or input data performed by the user that resulted in the error). When performing mappings, the assistance channels may include a web-based push channel, an instant message channel, a web-based chat channel, a text message channel, an email communication, an informational webpage, a dedicated application interface, a live agent channel or other type of communication channel having help information, an agent communication process, or a troubleshooting operation to resolve the error event. For example, an assistance channel may include calling the service provider, scheduling a call back, reviewing video content, and/or linking to a community forum or other channel for assistance. These assistance channels may therefore correspond to an escalation factor and/or ranking based on the assistance provided through the channel. In this regard, a channel that provides static data or a troubleshooting guide may be of less priority than a channel that allows a user to contact an agent and provide a live chat due to the limited resources of agent allocation and assistance and the passive manner of the data on the static channel.

When mapping the error events to the user intents and assistance channels so that users may be routed to particular assistance channels based on their user intent and the error event caused by the user's operations with the service provider, a rules engine may be utilized to create the mappings based on rules and parameters for the error events, user intents, and assistance channels. For example, the mappings may include connections or links between which user intents require specific assistance channels, which may be based on the rules of the rule engine. These mappings may be determined based on clustering, machine learning models, and/or administrator set links between the error events, the user intents, and the assistance channels. Further, the rules to establish the mappings may further be based on additional routing rules based on user engagement and/or priority, such as by escalating or deescalating the user's priority to receive a particular assistance channel based on how passive or active the user is with the service provider. A user that is actively performing an operation or requesting an important operation may be given higher priority than a user that may passively be browsing data or slowly requesting processing operations. Further, urgency rules for the particular error event or user intent may also escalate or deescalate the particular priority, and therefore a suitable assistance channel provided to a user based on issue priority. In this regard, an issue that requires immediate attention (e.g., identity confirmation, risk analysis and fraud detection, or currently pending electronic transaction processing, such as a payment or fund withdrawal) may be escalated to a higher priority assistance channel than another lower priority issue (e.g., user profile completion or data browsing).

The mappings may therefore be utilized to create rules governing allocation of an assistance or help channel, interface, and/or data to a user based on the particular error event (and corresponding user intent) that is detected for the user. Once the proactive outreach platform has completed building of the mappings, infrastructure, and integrations with the computing service of the service provider, the proactive outreach platform may then begin to monitor for particular error events so that the proactive outreach platform may automatically provide and/or route the user to the determined assistance channel, data, and/or operations based on the rule engine's mappings. The platform may implement a script, code segment or portion, or other executable process into data for the webpages, interfaces, services, and/or domains of the service provider. For example, a code segment (e.g., one or a few lines of code) may be injected or implemented into a header element or container of a particular page or interface, where the code segment then listens for error events when a user in on the particular page. The script or code segment is not required to be changed or altered for each page, and if the header or other data container is shared across the pages and/or interfaces of the service provider, injection of the code segment may be required only once (or a limited number of times based on commonality of the header) to begin listening for error events. If an error event does occur, the error event is routed back to the proactive outreach platform with any user or device information necessary to determine an assistance channel for the user to resolve the error event based on the user intent. The error event may similarly be caused by the aforementioned operational issues and errors that occur when the past users utilized the service provider's computing resources and services, or may be caused by a new error in utilizing the service provider's computing resources and services.

Once the data corresponding to the error event is detected and received by the proactive outreach platform, the rules engine's mappings may be used to select and determine a particular channel to assist the user based on the data. This may be based on the rules and mappings, as discussed herein. Once selected, the channel, data, and/or operations may be provided, communicated, or pushed to the user's device, such as over a network connection between the service provider's system and servers and the user's device. When presenting the assistance channel on the user's device, the proactive outreach platform may perform a UI transformation that adjusts, transforms, or replaces all or a portion of the device's UI displaying the service provider's interface and/or error event with the assistance channel. The user may then utilize the assistance channel to review data, communicate with an agent or other assistance entity (e.g., an automated chat bot that may respond to prompts and questions with data), provide a communication to the service provider or agents for later response, and/or engage in some process to receive assistance (e.g., search processes, further navigations, reentry of input or data, etc.). Further, based on the user's response, the mappings and/or rules may be updated, for example, if the assistance channel resolves the error event, if the user requests another assistance channel, or if the user abandons the process or does not resolve the user data. Thus, the user is not required to find and locate assistance channels, data, and/or operations, saving valuable computing resources, time, and user input in navigating to and locating the particular assistance resources. Moreover, the service provider may automatically route users to particular assistance channels in an intelligent manner based on processing past data and may automatically detect error events through a script shared across all the domains and pages of the service provider. Additionally, the service provider may conserve high priority resources in providing assistance and may more quickly and directly assist users without wasting computing resources and processing time.

Figure 1:
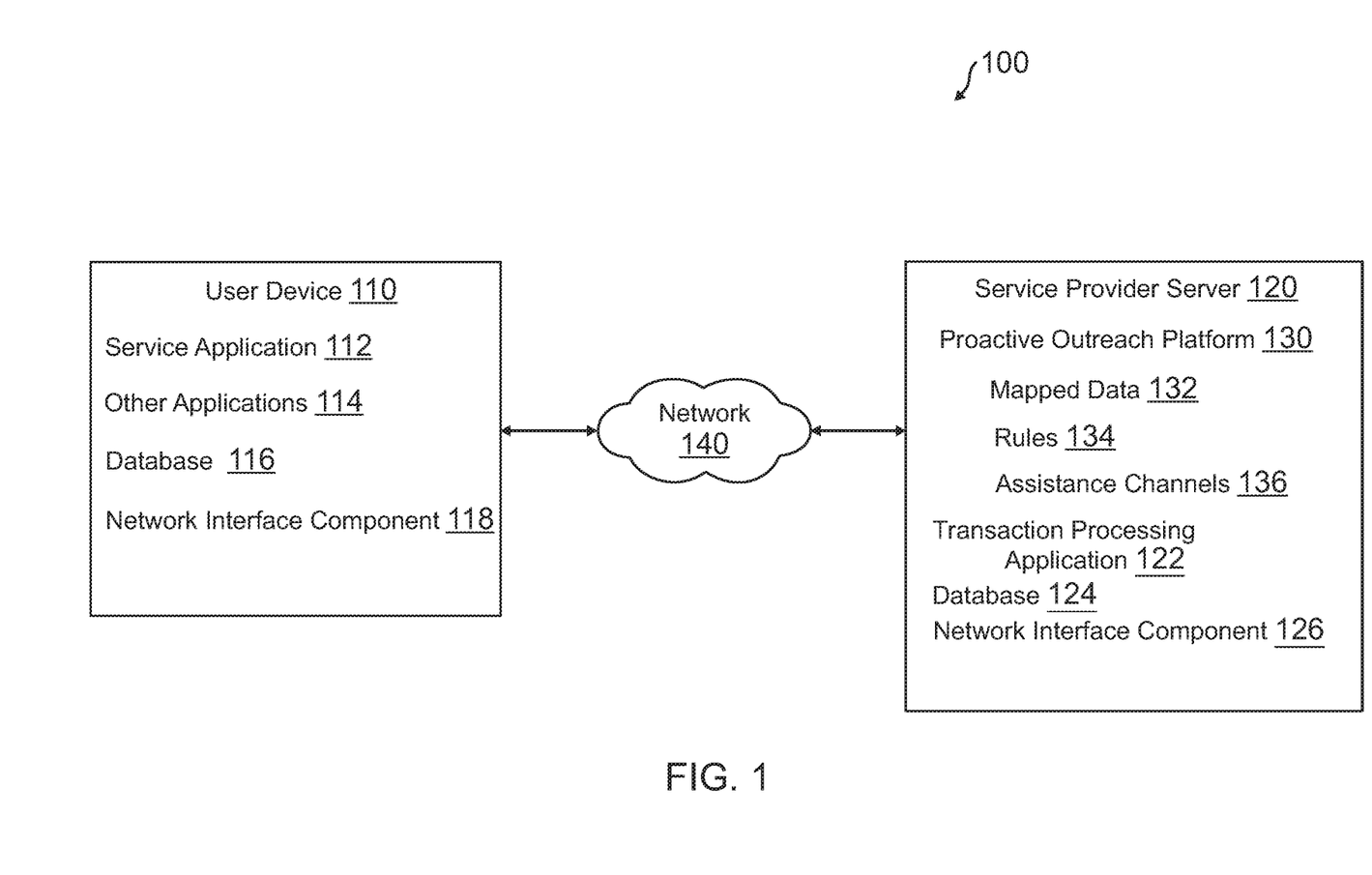
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity System 100 includes a client device 110 and a service provider server 120 in communication over a network 140. Client device 110 may be utilized by a user to access a computing service or resource provided by service provider server 120, where service provider server 120 may provide various data, operations, and other functions to client device 110 via network 140 and one or more applications and platforms. In this regard, client device 110 may encounter an error event that causes an issue in the use of the service between client device 110 and service provider server 120.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Client device 110 of FIG. 1 contains a service application 112, other applications 114, a database 116, and a network interface component 118. Service application 112 and other applications 114 may correspond to executable processes, procedures, and/or applications with associated hardware. In other embodiments, client device 110 may include additional or different modules having specialized hardware and/or software as required.

Service application 112 may correspond to one or more processes to execute software modules and associated components of client device 110 to provide features, services, and other operations for a user, such as a consumer, merchant, company, or other third-party entity that may utilize services and/or request resources from service provider server 120. In this regard, service application 112 may correspond to specialized hardware and/or software utilized by a user of client device 110 that may be used to access a website or UI provided by service provider server 120. Service application 112 may utilize one or more UIs, such as graphical user interfaces presented using an output display device of client device 110, to enable the user associated with client device 110 to enter and/or view data, navigate between different data, UIs, and executable processes, and request processing operations based on services provided by service provider server 120. In some embodiments, the UIs may display transaction data for a transaction (e.g., a payment to another entity, such as a user, merchant, or other payee), provide an account, financial data, or a digital token used to pay for the transaction data, and instruct service provider server 120 to perform transaction processing. In order to do this, service application 112 may render a UI during application execution, which may correspond to a webpage, domain, service, and/or platform provided by service provider server 120. However, during use of the UIs, operations, and other services of service provider server 120, client device 110 may encounter an error. Thus, service provider server 120 may provide a proactive outreach platform to provide proactive assistance through mapped error events, user intents, and assistance channels using a rules engine.

In some embodiments, service application 112 may include services for electronic transaction processing provided by service provider server 120. During transaction processing, service application 112 may be utilized to select payment instrument(s) for use in providing payment for a purchase transaction, transfer, or other financial process. As discussed herein, service application 112 may utilize user financial information, such as credit card data, bank account data, or other funding source data, as a payment instrument when providing payment information. Additionally, service application 112 may utilize a digital wallet associated with an account with a payment provider, such as service provider server 120, as the payment instrument, for example, through accessing a digital wallet or account of a user with service provider server 120 through entry of authentication credentials and/or by providing a data token that allows for processing using the account. Service application 112 may also be used to receive a receipt or other information based on transaction processing. However, in further embodiments, different services may be provided, including messaging, social networking, media posting or sharing, microblogging, data browsing and searching, online shopping, and other services available through online service providers. Each of these processes may encounter errors where assistance is provided in an intelligent and automated manner as discussed herein.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 140, or other types of applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of client device 110, such as display components capable of displaying information to users and other output components, including speakers. Other applications 114 may include other types of resident dedicated applications that include services that may encounter errors, where the errors are resolved as discussed herein.

Client device 110 may further include database 116 stored on a transitory and/or non-transitory memory of client device 110, which may store various applications and data and be utilized during execution of various modules of client device 110. Database 116 may include, for example, identifiers such as operating system registry entries, cookies associated with service application 112 and/or other applications 114, identifiers associated with hardware of client device 110, or other appropriate identifiers, such as identifiers used for payment/user/device authentication or identification, which may be communicated as identifying the user/client device 110 to service provider server 120. Moreover, database 116 may include UI data for display of UIs and other data and operations for service provider server 120, as well as any assistance channels and/or UI transformations that occur on-device to provide assistance to a user through the proactive outreach platform of service provider server 120.

Client device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide server-drive UI experiences through a framework that allows for generating and providing server-driven presentation of UIs on different device platforms. In this regard, service provider server 120 includes one or more processing applications which may be configured to interact with client device 110 to generate a UI and display the UI on client device 110. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a proactive outreach platform 130, a transaction processing application 122, a database 124, and a network interface component 126. Proactive outreach platform 130 and transaction processing application 122 may correspond to executable processes, procedures, and/or applications with associated hardware. In other embodiments, service provider server 120 may include additional or different modules having specialized hardware and/or software as required.

Proactive outreach platform 130 may correspond to one or more processes to execute modules and associated specialized hardware of service provider server 120 to provide a platform and framework to generate mappings of past error events to user intents and assistance channels using a rules-based engine, and further utilize the mappings and engine to provide proactive outreach to users when the users encounter error events during use of services and resources of service provider server 120. In this regard, proactive outreach platform 130 may correspond to specialized hardware and/or software used by service provider server 120 to first generate mappings between past error events encountered by past users when using the computing services and resources offered by service provider server 120. The past error events are aggregated, and then processed to generate mapped data 132 based on a rules engine using rules 134. Rules 134 may be established based on supervised and/or unsupervised machine learning algorithms and techniques to detect patterns and/or connections between the training data (e.g., the past error events having different issue resolutions using assistance channels 136 to provide help and other assistance to users in resolving errors and issues). Rules 134 may then be used to generate mapped data 132 based on the past error events, urgency or escalation factors, user engagement, and other data, where mapped data includes user intents from error events mapped to assistance channels 136. Mapped data 132 may then be used to provide the proactive outreach operations of proactive outreach platform 130.

After performing the mappings of the error events to the user intents and the assistance channels, proactive outreach platform 130 may be utilized to inject or insert a code segment, piece, or script (e.g., a one or a few lines of coding script) into a header or other data container of the pages, UIs, and other accessible data for services offered by service provider server 120. In this regard, the script may be inserted into a shared data container, such as if the header is shared across all pages, UIs, and/or domains. The script may be linked to a backend page and/or operation of proactive outreach platform 130 that allows for routing and processing of the error event using the mappings. Thereafter, proactive outreach platform 130 may listen for error events. When an error event is detected, such as an issue with entering or completing a checkout flow for a transaction to purchase items or a fund withdrawal or deposit operation with an account, proactive outreach platform 130 may then route and process the error event using the script and backend operations for error event processing. The error event may be routed to the proper assistance channel, which may further be based on user engagement (e.g., user activity and current channel or platform the user is using, such as mobile, chat, website, telephone, etc.) and issue priority/escalation. Thereafter, proactive outreach platform 130 may be used to perform a UI transformation to allow presentation of the assistance channel through a UI on client device 110. Proactive outreach platform 130 may further be used to monitor responses and error resolutions to update rules and mappings of the rules engine.

Transaction processing application 122 may correspond to one or more processes to execute modules and associated specialized hardware of service provider server 120 to process a transaction, which may be assistance by proactive outreach platform 130 in resolving user, device, or server processing errors that occur during transaction processing. In this regard, transaction processing application 122 may correspond to specialized hardware and/or software used by a user associated with client device 110 to establish a payment account and/or digital wallet, which may be used to generate and provide user data for the user, as well as process transactions. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account. The payment account may be accessed and/or used through a browser application and/or dedicated payment application executed by client device 110 and engage in transaction processing through transaction processing application 122, such as service application 112 that displays UIs from service provider server 120. Transaction processing application 122 may process the payment and may provide a transaction history to client device 110 for transaction authorization, approval, or denial.

Additionally, service provider server 120 includes database 124. Database 124 may store various identifiers associated with client device 110. Database 124 may also store account data, including payment instruments and authentication credentials, as well as transaction processing histories and data for processed transactions. Database 124 may store financial information and tokenization data. Database 124 may further store data necessary for proactive outreach platform 130, including mapped data 132, rules 134, and/or assistance channels 136, as well as any past or current error events requiring resolution.

In various embodiments, service provider server 120 includes at least one network interface component 126 adapted to communicate client device 110 over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
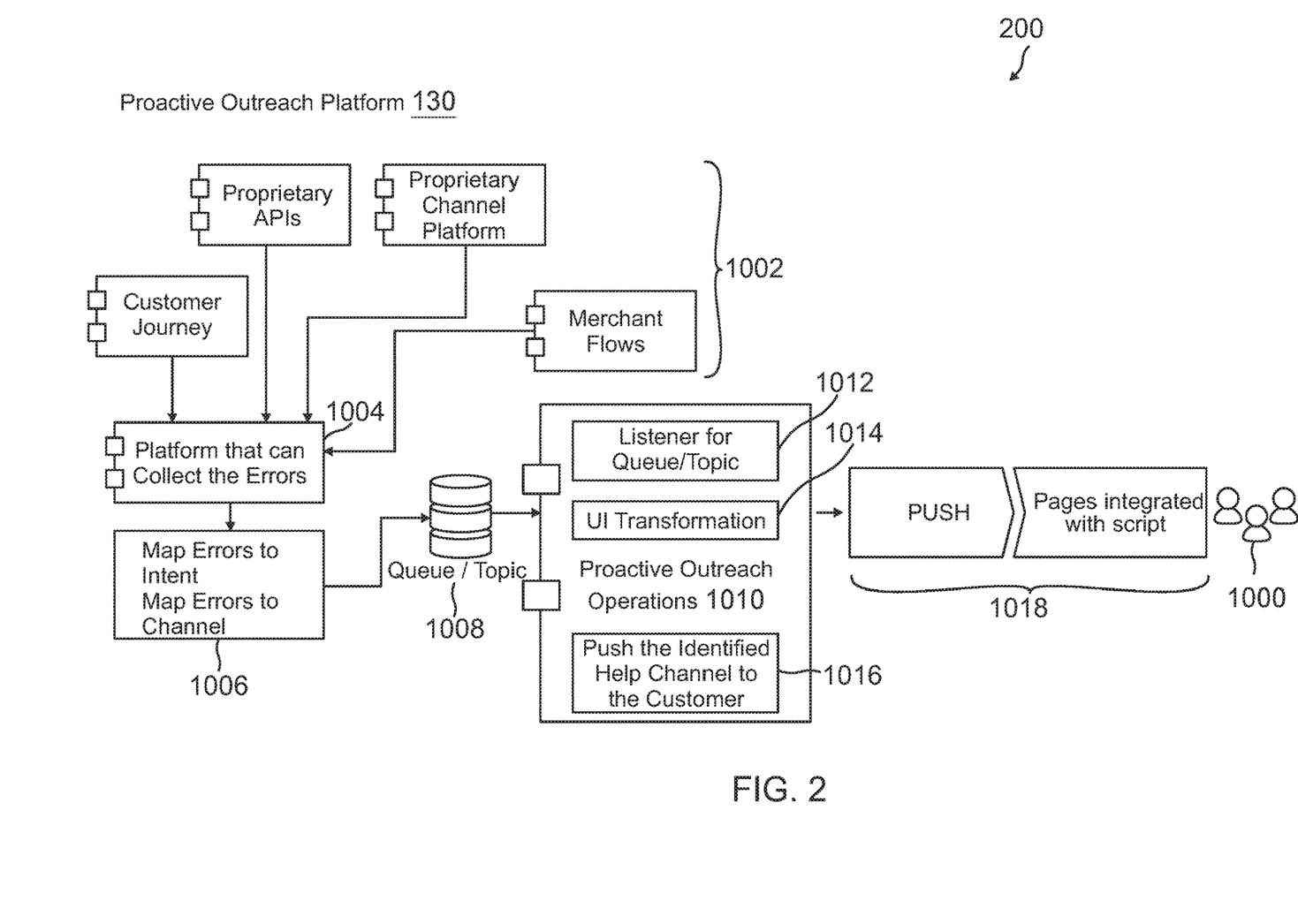
FIG. 2 is an exemplary system environment where error events may be aggregated and used to determine a proactive outreach platform to provide assistance to client devices, according to an embodiment.

FIG. 2 is an exemplary system 200 where error events may be aggregated and used to determine a proactive outreach platform to provide assistance to client devices, according to an embodiment. System 200 of FIG. 2 includes proactive outreach platform 130 discussed in reference to system 100 of FIG. 1, which may be executed by service provider server 120 when providing computing services and resources to end users 1000. In this regard, end users 1000 may access one or more services and/or resources of service provider server 120 to request operations, navigate between UIs and data, and otherwise interact with service provider server 120, for example, using client device 110 discussed in system 100.

System 200 shows how proactive outreach platform 130 may be used to provide targeted assistance channels in an intelligent and automated manner without requiring user requests for assistance, according to one embodiment. In order to provide proactive outreach platform 130 to assist users during errors and issues with utilizing service provider server 120 by end users 1000, proactive outreach platform 130 may be first aggregate data from different domains, services, and other platforms where error events may occur. For example, domains 1002 shows exemplary domains, such as merchant flows, a proprietary channel platform, proprietary APIs, and a customer journey service, that may be used to collect and aggregate error events that occur on the UIs and pages for the offered services. A customer journey service may provide an internal computing service that tracks a customer's or user's navigation through the different UIs, pages, and operations provided by service provider server 120. Using this tracked data, error events may be tracked and collected, which may assist proactive outreach platform 130 in aggregating data necessary to generate mappings to assistance channels. Proprietary channel platform and proprietary APIs may provide logs and/or a data tracker of activity of a customer, merchant, or other user of the system. Additionally, data collected for error events may also come from merchant flows, including checkout and payment flows that may encounter issues with electronic transaction processing, authentication, account establishment, etc.

Thereafter, a collection platform 1004 of proactive outreach platform 130 may collect the error events from the domains 1002, which may then be provided from collection platform 1004 to a mapping operation 1006 of proactive outreach platform 130. Collection platform 1004 may continuously collect the error events for updating of the mappings determined for the collected error events and may periodically or continuously update mapping operation 1006 for configuring of the mappings. Once acquired by mapping operation 1006, the errors may be mapped to intents and channels based on rules and other parameters for a rules engine that performs the mappings. The mappings may link particular error events to the intent of the user in performing an operation and a reason why the operation the user intended failed or caused the error. Further, mapping operation 1006 establishes channels that can assist the users with overcoming or resolving the error events by further linking the error events and user intents to those assistance channels.

Thereafter a queue/topic database 1008 may be utilized with the error event mappings, where queue/topic database 1008 includes information of available services where error events may occur for particular topics, and a queue of users based on the error events and assistance channels. In this regard, queue/topic database 1008 allows for routing of error events detected for end users 1000 to assistance channels based on the particular topic and a queue of assistance channels, users requiring assistance, user engagement, and/or issue priority. Proactive outreach operations 1010 may include those operations necessary to detect error events from queue/topic database 1008 and provide help through assistance channels using intelligent mappings. In this regard, a listener for queue/topic 1012 may correspond to a script inserted in pages and/or UIs to allow for detection of error events. When detected during use of service provider server 120 by one of end users 1000, an assistance channel may be determined by proactive outreach operations 1010 using the mappings. A UI transformation 1014 may be determined that allows for output of the assistance channel on a client device of one of end users 1000. Further, proactive outreach operations 1010 include a push operation 1016 to push the assistance channel to the client device using UI transformation 1014. Communications 1018 show a push operation that utilizes pages integrated with the script from listener for queue/topic 1012. Communications 1018 therefore allow display of the assistance channel on the client device being used by one of end users 1000.

Figure 3:
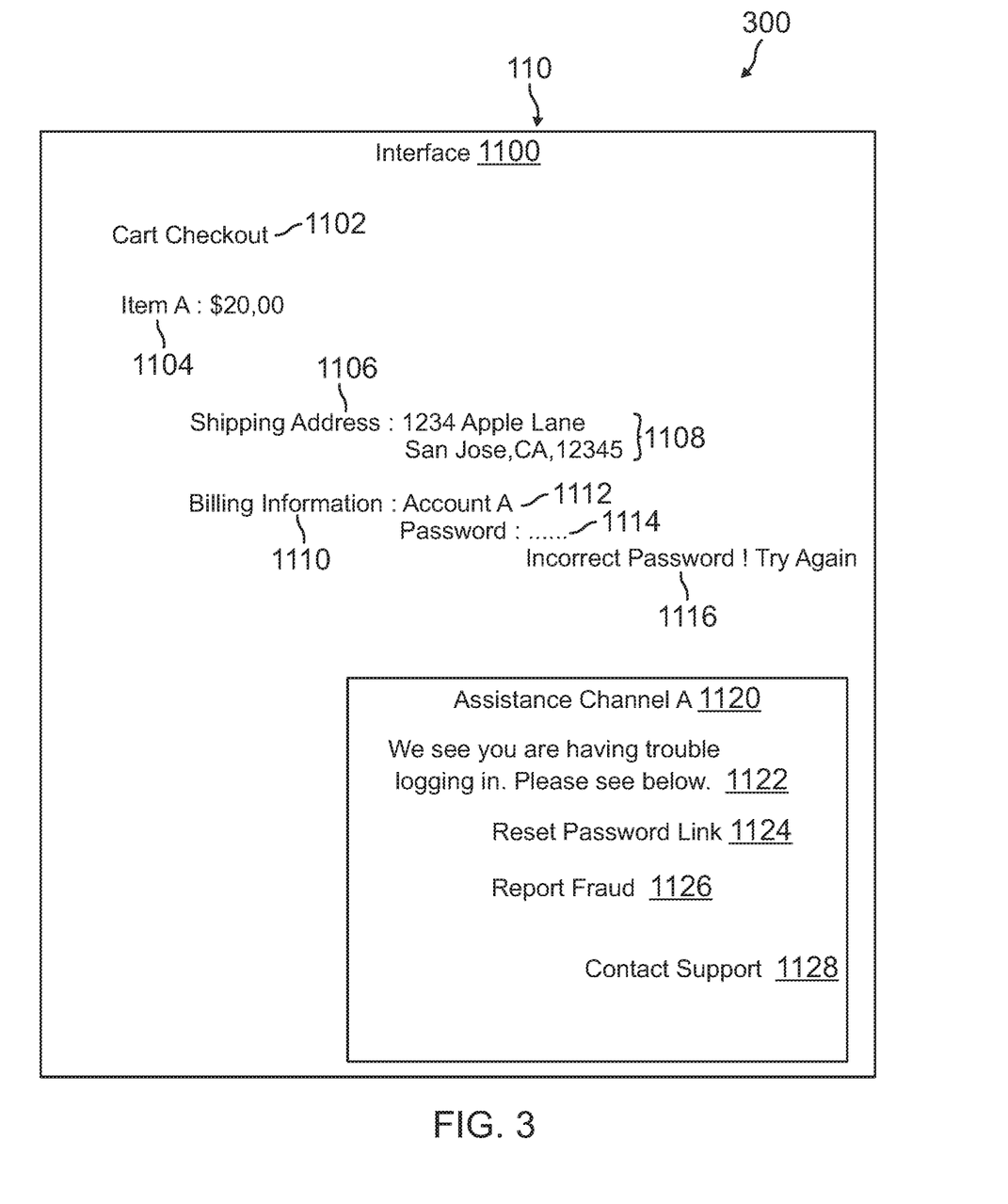
FIG. 3 is an exemplary environment displaying an interface for dynamically transforming a user interface to display an assistance communication channel during an error event, according to an embodiment.

FIG. 3 is an exemplary environment 300 displaying an interface for dynamically transforming a user interface to display an assistance communication channel during an error event, according to an embodiment. Environment 300 includes an interface 1100 displayed by a device, such as client device 110 in system 100 of FIG. 1. In this regard, the interface 1100 may be displayed when accessing a service, such as a checkout process for electronic transaction processing, where an error event may occur due to a failed authentication.

In environment 300, interface 1100 may be presented when client device 110 accesses one or more services, platforms, and/or resources provided by an online service provider, such as service provider server 120 in system 100. Interface 1100 may particularly correspond to a checkout processing flow that allows for a payment to be made to a counterparty, such as another user or merchant, and may be utilized on the service provider's platform or through integrations with other platforms including online merchant marketplaces. When processing a checkout on certain platforms and/or marketplaces, a digital shopping cart may be generated having one or more items that may be processed through the checkout services of the service provider. Thus, on a navigation to interface 1100 by client device 110, a cart checkout 1102 may be displayed for an item A 1104 in the digital cart. Item A 1104 shows a price of $20.00 that requires an electronic payment to be made to the other party.

To complete the electronic payment and transaction using the online service provider, certain data may be required and input to the fields and elements of interface 1100, which allows the backend operations of the service provider to electronically process the transaction and provide the payment to an account of the other party. Thus, interface 1100 may require the entry (either through user input, device cookies or other locally stored files, and/or account login and stored data use) of a shipping address 1106 and billing information 1110. Shipping address 1106 is shown as properly entered in shipping input 1108 and thus no error events are populated within interface 1100. However, regarding billing information 1110, interface 1100 is shown having a user attempting to use an account A 1112 (e.g., a payment account with the service provider or another online transaction processor) for the payment processing. When attempting to utilize account A 1112, a password 1114 is required. However, interface 1100 is displaying an error event 1116 that notifies the user "Incorrect Password! Try Again." Error event 1116 may be caused by mis-entering password 1114 required for account A 1112, such as if the user does not remember the password, incorrectly enters the password, or is maliciously attempting to use the account (e.g., a fraudster attempting an account takeover to fraudulently use the account). In some embodiments, event error 1116 may also or instead be caused by a risk assessment and risk reasons that require additional authentication. Thus, error event 1116 requires resolution to continue, where previously users were required to find an assistance channel, information, or operation on their own.

However, in environment 300, a proactive outreach platform may instead be utilized to provide an assistance channel in an automated and coordinated manner so that the user is not required to enter input, contact an agent or service provider, and/or navigate to new or different pages of the service provider's platform. An assistance channel A 1120 is shown through a UI transformation that displays assistance channel A 1120, where the UI transformation may correspond to an operation to adjust, change, or otherwise alter an initial presentation of interface 1100 to display assistance channel A 1120 in all or a portion of interface 1100 (e.g., alongside or with error event 1116 that caused selection of assistance channel A 1120). Assistance channel A 1120 may be selected by the mappings generated and utilized as discussed by systems 100 and 200, where selection may be performed based on determining a mapping of error event 1116 and other data (e.g., user engagement, urgency level, etc.) to a user intent, and assistance channel A 1120 corresponding to that user intent. Assistance channel A 1120 includes a message 1122 acknowledging error event 1116 to the user, as well as assistance topics, information, and operations. For example, the user may select a reset password link 1124 to perform a password reset, a report fraud option 1126 to report potential fraud if password 1114 has been changed without authorization or other fraud is detected, and a contact support option 1128 to receive live support that may allow for an agent to provide help and assistance. Reset password link 1124, report fraud option 1126, and/or contact support option 1128 may also be selected, added to, or found in assistance channel A 1120 based on the mappings performed by the proactive outreach platform. As such, the user is provided an easy way to view content on a display, as both the cart checkout 1102 and assistance channel A 1120 are on the same interface 1100.

Figure 4:
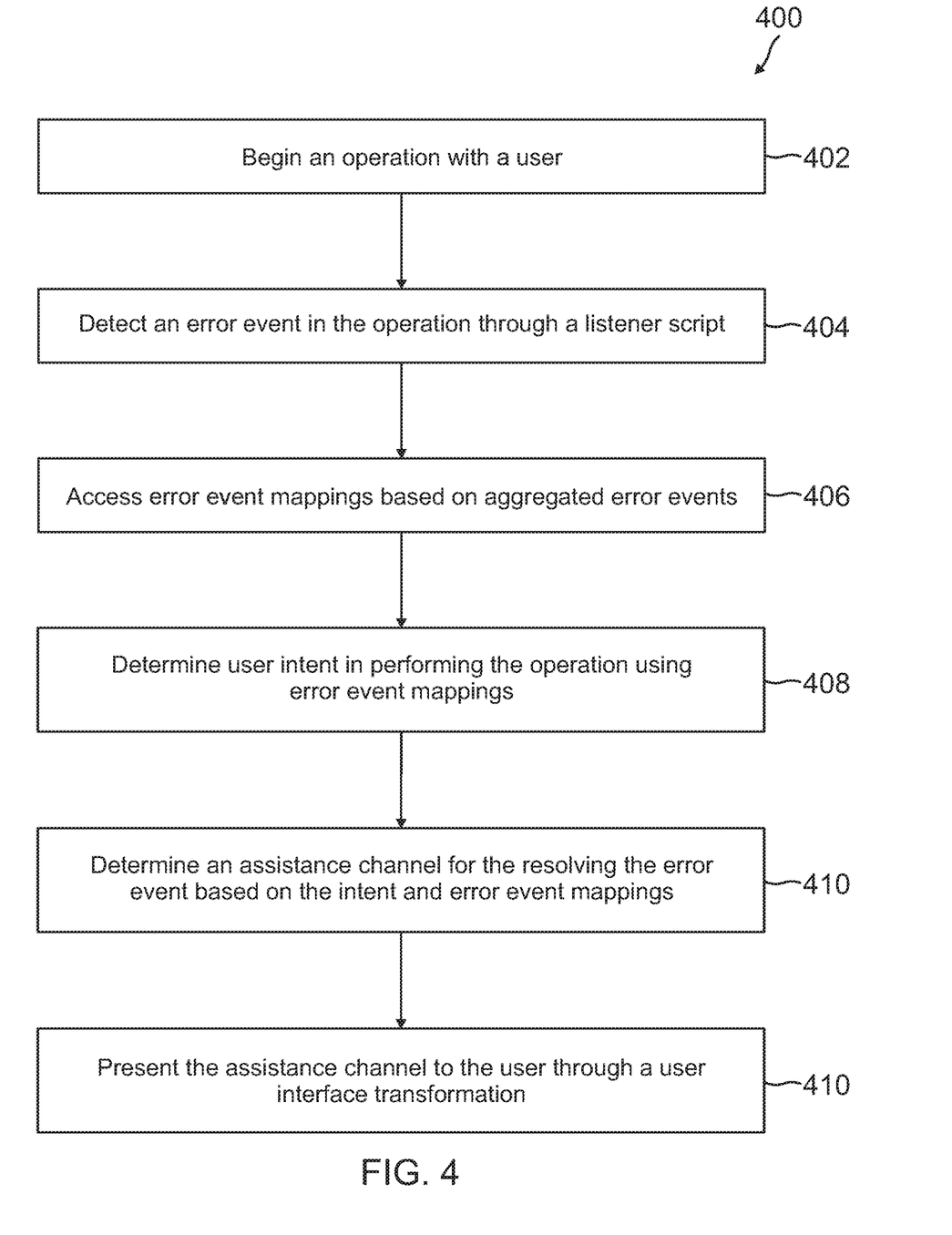
FIG. 4 is a flowchart of an exemplary process for a proactive outreach platform for server-driven communication channel presentation, according to an embodiment.

FIG. 4 is a flowchart 400 of an exemplary process for a proactive outreach platform for server-driven communication channel presentation, according to an embodiment. Note that one or more steps, processes, and methods described herein of flowchart 400 may be omitted, performed in a different sequence, or combined as desired or appropriate.

At step 402 of flowchart 400, an operation is begun with a user. The operation may correspond to some computing service or resource provided by a service provider. For example, a user may utilize a client device to access some online platform or domain of a service provider, which may offer services and use of computing resources of the service provider's infrastructure. This may correspond to electronic transaction processing, messaging and email, social and data posting applications, media services, etc. The user may navigate between pages and UIs of the service provider, and may request certain data processing, including processing of user input, uploading/downloading/streaming data, requesting an activity or action with another online user, account, or device, and the like. However, during that operation, an error event is detected in the operation through a listener script, at step 404. The script may previously have been inserted into a section of a page, data container, or other portion of code (e.g., HTML code for a webpage) by a proactive outreach platform of the service provider. The listener script therefore may correspond to a code segment that allows for detection of error events across all or a portion of the UIs offered by the service provider through their computing services.

Thereafter, at step 406, mappings are accessed based on aggregated error events. These mapping are previously generated by the proactive outreach platform using past error event mappings, which link error events to user intents in performing the operation with the service provider, which may further include user engagement and/or issue priority parameters, and further links those user intents to assistance channels that may resolve the error events based on the user intents. The proactive outreach platform may therefore aggregate the past user error events and utilize a rules engine using preestablished and/or trained rules for generation of the mappings. The mappings may therefore dictate routing of a particular error event to an assistance channel that can best resolve the error event in the fastest and most coordinated manner without requiring the user to actively search and locate the proper assistance channel. The assistance channels may be different in appearance, data, communication channel or network pathway (e.g., telephone, web-based chat, website article, etc.), and/or available operations for resolving the error events. Each of the assistance channels may also be given a priority and escalation factor depending on the user intent data determined from the error events.

A user intent in performing the operation is determined, at step 408, using the error event mappings. The user intent may correspond to a particular outcome that the user intended for the operation requested by the user, which resulted in the error event. For example, the user may have intended to perform an authentication, withdraw/transfer/deposit/pay funds, upload/download data, establish or utilize an account, or other operation associated with a service provided by the service provider. However, the operation may result in an error or other issue that prevents completion of the operation. Thus, the user intent, as well as associated intent data (e.g., user engagement and/or issue priority due to the user's and/or client device's actions when requesting the operation) is determined utilizing the past error event mappings.

Once determined, an assistance channel for resolving the error event is determined based on the intent and error event mappings, at step 410. The assistance channel map be selected based on the particular user intent to resolve the error event based on the user intent (e.g., requiring an authentication or electronic transaction processing). For example, the error event may be a failure of authentication or electronic transaction processing due to a risk rule and risk assessment. To resolve this error event, the user intent may be determined to be a requested account authentication or payment to another party using a checkout flow based on the error event mappings. Thereafter, an assistance channel may be determined that resolves the error event by determining that the user is required to speak to a risk assessment agent to resolve the noted issue with the risk assessment of that operation, such as to provide additional authentication material or validate the transaction in-person, respectively. Once the assistance channel is determined (as well as any necessary data or operations loaded within the channel), at step 412, the assistance channel is presented to the user through a UI transformation that causes the assistance channel to be presented to the user through a UI of the user's device. This UI transformation may cause a UI having the operation and/or error event to be adjusted or altered to present the assistance channel, which may be done to alert or notify the user in at least a portion of the UI.

Figure 5:
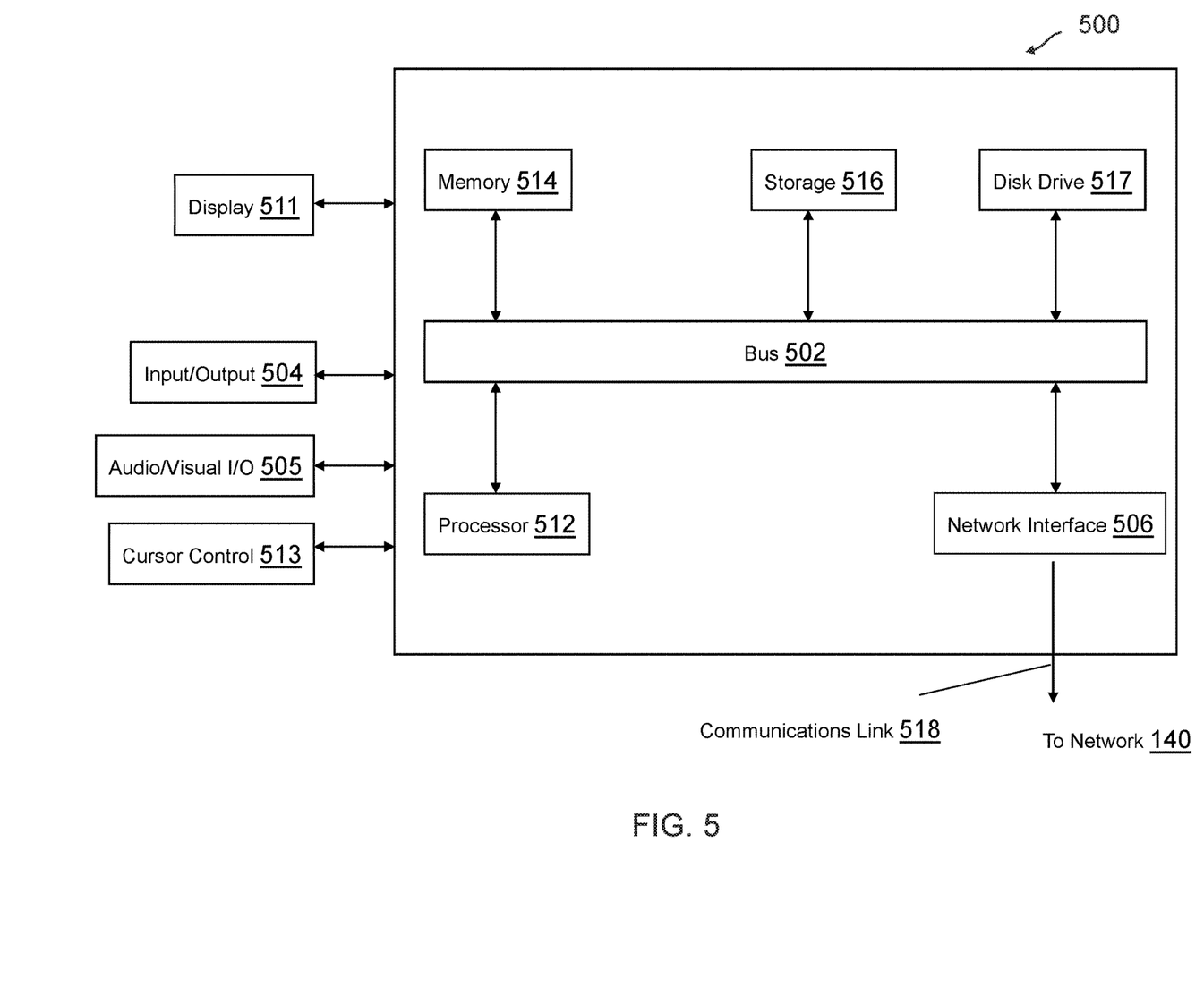
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
detecting, via a script, a first error event by a device of a user through a first interface of the system, wherein the script comprises a code segment implemented with a plurality of interfaces including the first interface, and wherein the code segment is unaltered between the plurality of interfaces;
inserting the script into interface page code for the plurality of interfaces of the system, wherein the script is inserted into a header of the interface page code, and wherein the header is shared by the plurality of interfaces across the system;
determining an operation from the device during the first error event using the code segment of the script;
determining a first intent of the user in utilizing the first interface to perform a first operation based on a plurality of user intent mapping rules;
determining an urgency level of the first error event with the user based on an electronic transaction processing operation causing the first error event when performed by the device;
determining a first assistance channel to assist the user in resolving the first error event based on the first intent, the urgency level, and a plurality of assistance channel mapping rules, wherein the first assistance channel comprises one of a plurality of different electronic communication channels available for communicating by the user with the system using the device; and
providing, through a graphical user interface (GUI) of the device, a first assistance option to the device of the user in the first assistance channel.

2. The system of claim 1, wherein, before the detecting the first error event, the operations further comprise:
aggregating previous error events tracked across domains of the system, wherein the previous error events are caused by processing errors of the system during previous uses of the domains by previous users of the system;
determining the plurality of user intent mapping rules based on first mappings of user intents in utilizing the domains during the previous uses to the previous error events; and
determining the plurality of assistance channel mapping rules based on second mappings of the user intents and severity ratings of the previous error events to assistance channels of the system.

3. The system of claim 2, wherein presentations of the assistance channels for the system differ based on the plurality of assistance channel mapping rules, and wherein each of the presentations comprises at least one of assistance information or an assistance operation based on the user intents and the previous error events.

4. The system of claim 2, wherein each of the assistance channels comprises one of a web-based push channel, an instant message channel, a web-based chat channel, a text message channel, an email communication, an informational webpage, a dedicated application interface, or a live agent channel.

5. The system of claim 2, wherein the previous error events are tracked across the domains for the aggregating using a tracking platform of the system and at least one of a customer journey service for the previous uses the domains, application programming interfaces (APIs) associated with risk rules for the previous uses, and merchant flows engaged in during the previous uses.

6. The system of claim 1, further comprising a proactive outreach platform, wherein the operations are performed through the proactive outreach platform, and wherein the providing the first assistance option via the first assistance channel comprises:
performing a user interface (UI) transformation for the first interface to display the first assistance option via the first assistance channel.

7. The system of claim 1, wherein the operations further comprise:
detecting a second error event through one of the first interface or a second interface of the system;
determining a second intent to perform a second operation based on the plurality of user intent mapping rules;
determining a second assistance channel to assist in resolving the second error event based on the second intent and the plurality of assistance channel mapping rules; and
providing, via the second assistance channel, the first assistance option or a second assistance option.

8. The system of claim 1, wherein the providing the first assistance option via the first assistance channel occurs dynamically and in real-time with the first error event, and wherein the providing the first assistance option via the first assistance channel occurs without administrative input by a help administrator of the system.

9. A method comprising:
receiving, from actions occurring on a plurality of service provider interfaces of a service provider, a plurality of error events occurring during past uses of the service provider via a code segment implemented within the service provider interfaces that is unaltered between different ones of the service provider interfaces;
inserting the code segment into service provider interface page code for the plurality of service provider interface of the service provider, wherein the code segment is inserted into a header of the service provider interfaces page code, and wherein the header is shared by at least a portion of the plurality of service provider interfaces across one or more domains of the service provider;
determining computing device operations from the actions during the plurality of error events using the code segment;
generating a plurality of error assistance rules based on the plurality of error events and the computing device operations, wherein the plurality of error assistance rules comprise a first mapping of the plurality of error events to a plurality of user intents in utilizing the service provider and a second mapping of the plurality of user intents to a plurality of help channels for assistance in resolving the plurality of error events, wherein the plurality of help channels comprise a plurality of different electronic communication channels available for communication with the service provider;

receiving an error event occurring via one of the plurality of service provider interfaces by a computing device using the code segment;

determining a user intent of the plurality of user intents in utilizing the service provider based on the error event and the plurality of error assistance rules;

determining an urgency level of the error event based on an electronic transaction processing operation causing the error event when performed by the computing device;

determining a help channel of the plurality of help channels to resolve the error event based on the user intent, the urgency level, and the plurality of error assistance rules, wherein the help channel comprises one of the plurality of different electronic communication channels available for communicating by the computing device with the service provider; and presenting the help channel via the computing device.

10. The method of claim 9, wherein the presenting the help channel comprises:

determining an output interface for display of the help channel on the computing device; and performing an interface transformation of the one of the plurality of service provider interfaces based on the output interface.

11. The method of claim 9, wherein the determining the urgency level is further based on an escalation factor in resolving the error event for the user intent, and wherein the escalation factor is associated with one of an account verification, an identity verification, or a fraud detection result during the electronic transaction processing operation.

12. The method of claim 11, wherein the electronic transaction processing operation causes the error event based on at least one of an operational error of a process of the service provider, user input provided by the computing device via the one of the plurality of service provider interfaces, or a navigational error during the process of the service provider.

13. The method of claim 12, wherein the help channel comprises a live chat with an agent of the service provider.

14. The method of claim 9, wherein the presenting the help channel comprises:

determining a communication operation to display the help channel on the computing device; and transmitting the help channel to the computing device via the communication operation.

15. The method of claim 14, wherein the help channel comprises at least one of help information, an agent communication, or a troubleshooting operation to resolve the error event based on the user intent.

16. The method of claim 9, wherein the receiving the plurality of error events comprises:

aggregating error data caused by faulty operations of the service provider during the past uses by a plurality of users when requesting data processing operations by the service provider, wherein the error data is associated with a navigational error, an electronic transaction processing error, or an account usage error.

17. A non-transitory machine-readable medium having stored thereon machine-readable instructions executable to cause a machine to perform operations comprising:

aggregating, from past uses of a service provider system, error events caused by the past uses through webpages hosted by the service provider system via a coding script implemented within the webpages that is unaltered between different ones of the webpages, wherein the coding script comprises a listener operation for the error events and a linking operation to assistance channels based on assistance routing rules;

determining computing device operations during the past uses of the webpages using the coding script;

determining urgency levels of the error events based on electronic transaction processing operations causing the error events when the past uses are performed through the webpages and the computing device operations;

determining, based on least on the urgency levels, the assistance routing rules for the assistance channels of the service provider, wherein the assistance channels comprise assistance information based on the urgency levels and user intents in utilizing the service provider system during the past uses, and wherein the assistance channels comprises a plurality of different electronic communication channels available for communicating with the service provider system;

inserting the coding script into a header element of the webpages, wherein the header is utilized by one or more of the webpages hosted by one or more domains of the service provider; and monitoring for the error events via the coding script.

18. The non-transitory machine-readable medium of claim 17, wherein the operations further comprise:

detecting, from a device of a user, one of the error events during an operation performed by the device on one of the webpages via the coding script;

determining one of the assistance channels for the user to resolve the one of the error events based on the assistance routing rules, wherein the one of the assistance channels is determined based on one of the user intents and one of the urgency levels associated with the one of the error events and the operation performed by the device; and presenting the assistance information associated with the one of the user intents and the one of the urgency levels via the one of the assistance channels.

\* \* \* \* \*